(12) United States Patent
Soundararajan et al.

(10) Patent No.: US 12,032,716 B2
(45) Date of Patent: Jul. 9, 2024

(54) ACCESSING INFORMATION BASED ON PRIVILEGES

(71) Applicant: Hewlett Packard Enterprise Development LP, Spring, TX (US)

(72) Inventors: Abilash Soundararajan, Karnataka (IN); Michael Reid Tennefoss, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/158,559

(22) Filed: Jan. 24, 2023

(65) Prior Publication Data

US 2023/0161898 A1 May 25, 2023

Related U.S. Application Data

(63) Continuation of application No. 16/757,693, filed as application No. PCT/US2017/057556 on Oct. 20, 2017, now Pat. No. 11,604,890.

(51) Int. Cl.
*G06F 21/62* (2013.01)
*G06F 16/23* (2019.01)
(Continued)

(52) U.S. Cl.
CPC ...... *G06F 21/6227* (2013.01); *G06F 16/2315* (2019.01); *G06F 16/2455* (2019.01);
(Continued)

(58) Field of Classification Search
None
See application file for complete search history.

(56) References Cited

U.S. PATENT DOCUMENTS

| 8,042,163 B1 | 10/2011 | Karr et al. |
| 8,793,509 B1 | 7/2014 | Nelson et al. |

(Continued)

FOREIGN PATENT DOCUMENTS

| CN | 103051630 A | 4/2013 |
| CN | 105659558 A | 6/2016 |

(Continued)

OTHER PUBLICATIONS

Basic Attention Token, "Announcing a new Blockchain-Based Digital Advertising Platform", available online at <https://medium.com/@AttentionToken/announcing-a-new-blockchain-based-digital-advertising-platform-775203933c44>, Mar. 23, 2017, 4 pages.

(Continued)

*Primary Examiner* — Venkat Perungavoor
(74) *Attorney, Agent, or Firm* — Hewlett Packard Enterprise Patent Department

(57) ABSTRACT

In some examples, a system is to receive, from a client device, a query comprising a representation of blockchain information of an entity associated with an electronic device that advertised the representation. The system is to further determine whether a client entity associated with the client device has a privilege to access response information that is responsive to the query, and in response to determining that the client entity has the privilege to access the response information, send, to a blockchain network, a request containing the blockchain information to obtain the response information.

17 Claims, 3 Drawing Sheets

(51) Int. Cl.

| | |
|---|---|
| G06F 16/2455 | (2019.01) |
| G06F 21/71 | (2013.01) |
| G06Q 10/10 | (2023.01) |
| G06Q 20/10 | (2012.01) |
| G06Q 20/36 | (2012.01) |
| G06Q 20/40 | (2012.01) |
| H04L 9/40 | (2022.01) |
| H04L 9/30 | (2006.01) |

(52) U.S. Cl.
CPC .......... *G06Q 10/10* (2013.01); *G06Q 20/102* (2013.01); *G06Q 20/3674* (2013.01); *G06Q 20/4014* (2013.01); *H04L 63/105* (2013.01); *G06F 2221/2141* (2013.01); *G06Q 2220/00* (2013.01)

(56) References Cited

U.S. PATENT DOCUMENTS

| | | | |
|---|---|---|---|
| 9,569,771 | B2 | 2/2017 | Lesavich et al. |
| 9,635,000 | B1 | 4/2017 | Muftic |
| 9,648,007 | B1 | 5/2017 | Sterling et al. |
| 9,722,790 | B2 | 8/2017 | Ebrahimi |
| 9,980,137 | B2 | 5/2018 | South et al. |
| 10,194,320 | B1 | 1/2019 | Egner et al. |
| 11,025,409 | B1* | 6/2021 | Fields .................. H04L 9/50 |
| 11,226,956 | B2 | 1/2022 | Somani et al. |
| 2005/0015591 | A1 | 1/2005 | Thrash et al. |
| 2006/0236382 | A1 | 10/2006 | Hinton et al. |
| 2012/0150750 | A1 | 6/2012 | Law et al. |
| 2013/0104211 | A1 | 4/2013 | Nandakumar |
| 2013/0333009 | A1 | 12/2013 | Mackler |
| 2014/0059213 | A1 | 2/2014 | Ollikainen et al. |
| 2014/0215594 | A1 | 7/2014 | Lambert |
| 2014/0380040 | A1 | 12/2014 | Albahdal et al. |
| 2016/0055322 | A1 | 2/2016 | Thomas |
| 2016/0088424 | A1 | 3/2016 | Polo et al. |
| 2016/0342977 | A1* | 11/2016 | Lam .................. G06Q 20/0658 |
| 2016/0342989 | A1 | 11/2016 | Davis |
| 2017/0076306 | A1 | 3/2017 | Snider et al. |
| 2017/0091397 | A1 | 3/2017 | Shah |
| 2017/0132619 | A1 | 5/2017 | Miller et al. |
| 2017/0132620 | A1 | 5/2017 | Miller et al. |
| 2017/0132625 | A1 | 5/2017 | Kennedy |
| 2017/0132630 | A1 | 5/2017 | Castinado et al. |
| 2017/0134429 | A1 | 5/2017 | Gustafsson |
| 2017/0163733 | A1 | 6/2017 | Grefen et al. |
| 2017/0177898 | A1 | 6/2017 | Dillenberger |
| 2017/0220815 | A1* | 8/2017 | Ansari ............... G06Q 20/3829 |
| 2017/0228371 | A1 | 8/2017 | Seger, II |
| 2017/0230375 | A1 | 8/2017 | Kurian |
| 2017/0230791 | A1 | 8/2017 | Jones |
| 2017/0232300 | A1 | 8/2017 | Tran et al. |
| 2017/0236123 | A1 | 8/2017 | Ali et al. |
| 2017/0243208 | A1 | 8/2017 | Kurian et al. |
| 2017/0262902 | A1 | 9/2017 | Weston et al. |
| 2017/0302450 | A1 | 10/2017 | Ebrahimi |
| 2017/0330174 | A1 | 11/2017 | Demarinis et al. |
| 2018/0060496 | A1 | 3/2018 | Bulleit et al. |
| 2018/0174122 | A1 | 6/2018 | Mattingly et al. |
| 2018/0182052 | A1 | 6/2018 | Panagos |
| 2018/0316502 | A1 | 11/2018 | Nadeau et al. |
| 2018/0337771 | A1 | 11/2018 | Baker et al. |
| 2018/0349572 | A1 | 12/2018 | Chen et al. |
| 2019/0081796 | A1 | 3/2019 | Chow et al. |
| 2019/0140822 | A1 | 5/2019 | Xie et al. |
| 2019/0215162 | A1 | 7/2019 | Dickenson et al. |
| 2019/0238550 | A1* | 8/2019 | Zhang .................. H04L 63/105 |
| 2019/0268284 | A1 | 8/2019 | Karame et al. |
| 2019/0280875 | A1 | 9/2019 | Ragnoni et al. |
| 2019/0289019 | A1 | 9/2019 | Thekadath et al. |
| 2019/0296915 | A1* | 9/2019 | Lancashire ............ H04L 9/3247 |
| 2021/0082045 | A1* | 3/2021 | Assia .................. G06Q 20/389 |
| 2021/0149883 | A1 | 5/2021 | Yu et al. |
| 2021/0243193 | A1 | 8/2021 | Padmanabhan |
| 2022/0019575 | A1 | 1/2022 | Qian |
| 2022/0343768 | A1* | 10/2022 | Di Cosola .......... G06Q 10/0832 |
| 2023/0237467 | A1* | 7/2023 | Yu .......................... G06Q 40/04 705/4 |

FOREIGN PATENT DOCUMENTS

| | | |
|---|---|---|
| CN | 106911641 A | 6/2017 |
| CN | 106953838 A | 7/2017 |
| CN | 107113179 A | 8/2017 |
| CN | 109417465 A | 3/2019 |
| EP | 3200167 A1 | 8/2017 |
| EP | 3396576 A1 | 10/2018 |
| KR | 10-1661933 B1 | 10/2016 |
| KR | 10-1701131 B1 | 2/2017 |
| KR | 10-1723405 B1 | 4/2017 |
| KR | 10-1767534 B1 | 8/2017 |
| TW | 201732706 A | 9/2017 |
| WO | 2014/099688 A1 | 6/2014 |
| WO | 2015/187608 A1 | 12/2015 |
| WO | 2016/202952 A1 | 12/2016 |
| WO | 2017/054985 A1 | 4/2017 |
| WO | 2017/065389 A1 | 4/2017 |
| WO | 2017/079218 A1 | 5/2017 |
| WO | 2017/104899 A1 | 6/2017 |
| WO | 2017/107976 A1 | 6/2017 |
| WO | 2017/127564 A1 | 7/2017 |
| WO | 2017/131788 A1 | 8/2017 |
| WO | 2017/146333 A1 | 8/2017 |
| WO | 2018/113572 A1 | 6/2018 |

OTHER PUBLICATIONS

Bitcoin Exchange Guide, "ATMChain—Smart Media Advertising Blockchain Network ICO?", available online at <https://bitcoinexchangeguide.com/atmchain/>, Aug. 16, 2017, 6 pages.

Blockchained Technology, "Data Storage with Blockchain Technology", available online at <http://blockchained.blogspot.in/2015/03/data-storage-with-blockchain-technology.html>, Mar. 17, 2015, 4 pages.

Christidis et al., "Blockchains and Smart Contracts for the Internet of Things", IEEE, 2016, pp. 2292-2303.

Ethereum, "When would it make sense to use node server for an application using smart contracts?", available online at <https://ethereum.stackexchange.com/questions/25830/when-would-it-make-sense-to-use-node-server-for-an-application-using-smart-contr>, Sep. 7, 2017, 4 pages.

Extended European Search Report Received for EP Patent Application No. 17928996.2, mailed on May 4, 2021, 9 pages.

Extended European Search Report Received for EP Patent Application No. 17929402.0, mailed on Mar. 5, 2021, 8 pages.

Jai Singh Arun, "Reimagining the Future of Identity Management With Blockchain", available online at <https://securityintelligence.com/reimagining-the-future-of-identity-management-with-blockchain/>, Mar. 7, 2017, 6 pages.

Kiviharju ("Enforcing Role-Based Access Control with Attribute-Based Cryptography in MLS Environments", Puolustusvoimien tutkimuslaitos, Jun. 13, 2017, 237 pages) (Year: 2017).

Kuo et al., "Blockchain distributed ledger technologies for biomedical and health care applications", Journal of the American Medical informatics Association, Sep. 8, 2017, pp. 1211-1220.

Lee et al., "Electronic Voting Service Using Block-Chain", JDFSL, 2016, 15 pages.

Moinet et al., "Blockchain based trust & authentication for decentralized sensor networks", Jun. 6, 2017, pp. 1-6.

Peter Saint-Andre, "How can blockchains improve the Internet of Things?", available online at <https://coincenter.org/entry/how-can-blockchains-improve-the-internet-of-things>, Oct. 11, 2016, 8 pages.

Robert Hof, "How MetaX Plans to Use Blockchain to Stop Ad Fraud", available online at <https://www.forbes.com/sites/roberthof/2017/03/21/how-metax-plans-to-use-blockchain-to-stop-ad-fraud/#4088d01d59da>, Mar. 21, 2017, 2 pages.

Search Report and Written Opinion received for PCT Patent Application No. PCT/US2017/057554, mailed on Jul. 13, 2018, 14 pages.

(56) References Cited

OTHER PUBLICATIONS

Search Report and Written Opinion received for PCT Patent Application No. PCT/US2017/057556, mailed on Jul. 4, 2018, 8 pages.
Search Report and Written Opinion received for PCT Patent Application No. PCT/US2017/057558, mailed on Jul. 4, 2018, 9 pages.
Search Report and Written Opinion received for PCT Patent Application No. PCT/US2017/057560, mailed on Jul. 20, 2018, 12 pages.
Shae et al., "On the Design of a Blockchain Platform for Clinical Trial and Precision Medicine", IEEE 37th International Conference on Distributed Computing Systems, 2017, pp. 1972-1980.
Tran et al., "Regerator: a Registry Generator for Blockchain", CAiSE 2017 Forum and Doctoral Consortium Papers, 2017, pp. 81-88.
Swan, Blockchain 3.0: Fair Applications Beyond Money, Economies, and Markets, Blockchain: Blueprint for a New Economy (book), Jan. 2016, pp. 101-120.

* cited by examiner

ACCESSING INFORMATION BASED ON PRIVILEGES

CROSS-REFERENCE TO RELATED APPLICATIONS

This application is a continuation application of and claims priority to application Ser. No. 16/757,693 filed on Apr. 20, 2020 which claims the benefit under 35 U.S.C. § 119(e) of PCT Application No. PCT/US2017/057556 filed Oct. 20, 2017, the contents of which are hereby incorporated by reference in their entireties.

BACKGROUND

The proliferation of network-enabled electronic devices, and the availability of new communication and data exchange technologies, have made possible new methods of device-to-device, device-to-user, and device-to-application interactions. For example, information can be collected directly from individual electronic devices. Alternately, information can be obtained indirectly from other data sources about the electronic devices or users, products, programs, or other components associated with the electronic devices.

BRIEF DESCRIPTION OF THE DRAWINGS

Some implementations of the present disclosure are described with respect to the following figures.

Figure 1:
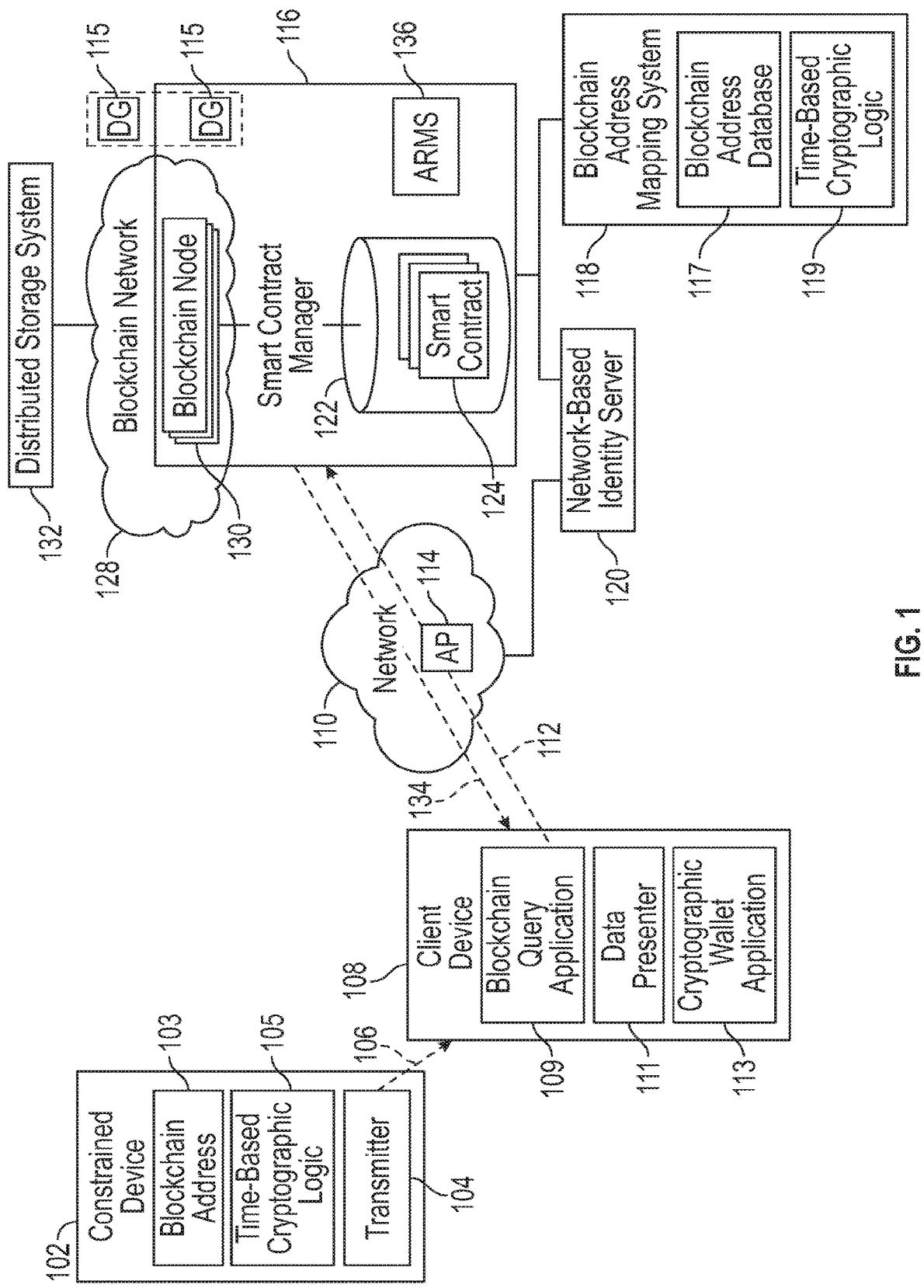
FIG. 1 is a block diagram of an arrangement that includes a constrained device, a client device, and various backend nodes according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A "constrained device" can refer to a device that has restricted computing resources (e.g., processing resources, storage resources, communication resources, etc.) and/or power available to the device. A constrained device is distinguished from more general purpose computing devices such as smartphones, tablet computers, notebook computers, desktop computers, server computers, and so forth. A constrained device may use wired communications (e.g., copper, coaxial cable, and/or optical fiber communications) and/or wireless communications (e.g., radio frequency, infrared, ultrasonic, infrasonic, and/or laser).

As discussed further below, in contexts where blockchain technologies are used, a constrained device can be constrained in the processing of a blockchain. The concept of a blockchain is explained further below.

Examples of constrained devices include sensors, actuators, cameras, radio frequency identification (RFID) tags, and so forth. In some examples, constrained devices can include devices that transmit information according to an advertisement protocol using Bluetooth Low Energy (BLE) or cellular technology or other wireless technology. Generally, an advertisement protocol allows a device, such as a constrained device, to advertise information that can be used for some specified purpose.

In some examples, electronic devices such as constrained devices can transmit data useable to initiate, automate, and/or augment interactions in a physical world among entities (e.g., users, machines, programs, etc.), where such data are known as a "beacon." A beacon can be in the form of a data packet, multiple data packets, a signal, and so forth.

For example, the information in a transmitted beacon can be used in any of the following interactions: purchasing products, obtaining further information about a product or its attributes, tracking inventory, obtaining healthcare services, detecting theft, performing law enforcement activities (e.g., a law enforcement officer can obtain information of a driver based on information in a beacon), purchasing insurance policies, and so forth.

The authenticity of a beacon and the transmitted data from constrained devices have to be ascertained prior to using the data to prevent the ingestion of malicious, false, misleading, or otherwise untrustworthy data. For example, such untrustworthy data may be used by a malicious entity in an attempt to manipulate interactions and/or to obtain information that would not otherwise be provided. Additionally, information transmitted by constrained devices can be subject to copying, playback, and malicious use by hackers.

Moreover, depending on who or what (a "client entity") is requesting information based on a beacon transmitted by a constrained device, it may not be desirable to transmit all available information to the client entity in response to a query that is based on the beacon. A "client entity" refers to an entity associated with a client device. A client entity can refer to any of the following: the client device itself, a user of the client device, a program or component in the client device, and so forth.

In accordance with some implementations of the present disclosure, a data governance system can filter information to transmit to a client entity based on a privilege level associated with the client entity. Different filtering can be applied for different privilege levels, such that client entities having different privilege levels would receive different filtered information. As a result, the data governance system is able to deliver different customized information to different client entities, based on respective privilege levels of the different client entities. A privilege level of a client entity can refer to an indication of a class of information that the client entity is entitled to receive or has been designated to receive. Privilege levels can be indicated using different classifications, such as in the form of numerical values, group names, need-to-know status, organizational affiliation, and so forth.

The information delivered by the data governance system may have been created at different points in time by different entities (referred to as "owners" of the information) and stored in distributed database, such as in blocks of a blockchain. As a result, a single malicious entity would not be able to forge the information delivered to a client entity. The data governance system has access to smart contracts that define the privilege levels of client entities. Using the smart contracts, the data governance system can collect and deliver the customized information that is interest to the client entities. Note that the delivered information is not created or manipulated by a constrained device that sends a beacon.

The privilege levels that are defined in smart contracts can correspond to roles of respective client entities, where a role of a client entity can be determined according to any or some combination of the following: by an authentication system that authenticates a client entity, by a business logic engine that implements services for client entities, based on proximity of a client entity to a location or another entity, and so forth. A "role" of an entity can refer to information indicating a responsibility of or task(s) to be performed by the entity. For example, a human user can have a role of a police officer, a dispatcher, a shopper, a patient, a healthcare provider, etc. As another example, a machine or program can have a role of tracking inventory, managing an information technology infrastructure, and so forth.

As a result, in cooperation with use of constrained devices, a blockchain network, smart contracts, and an authentication system, the data governance system is able to deliver customized information to client entities, where the delivered information is trustworthy and in some cases can include secure historic information.

A blockchain refers to a distributed collection of records (referred to as "blocks") that are linked and secured cryptographically. A blockchain can also refer to a continuous and unbroken ledger of blocks. The blocks of the blockchain can be distributed across a large number of computing devices. Each block can include various information, including transaction data for a transaction represented by the block, a timestamp, and a reference to a previous block in the blockchain. As new transactions occur, new blocks are created for the new transactions and added to the blockchain. A blockchain (which form a distributed transaction ledger) records transactions among multiple entities in a verifiable and permanent way. Once a block is created and the data of the block recorded, the block cannot be altered without alteration of subsequent blocks.

Multiple entities can see the transaction ledger, but because of the decentralized nature of the distributed collection of blocks records are protected against hacking or corruption by a malicious entity. Validation of each block that gets added to the blockchain is done by every node by validating its hash by applying a hashing function. If the validation fails, then that node drops the block from the blockchain.

A blockchain network includes nodes (referred to as blockchain nodes, full nodes, or blockchain full nodes) that can process requests to access the information.

A smart contract provides logic and rules executed by computing device(s) for a blockchain to automate terms of a contract among multiple entities. A smart contract can include blockchain addresses of the parties of the smart contract, information relating to terms of the smart contract, and other information. A smart contract can be established among multiple entities. A smart contract manager implements enforcement of smart contracts. A smart contract manager can process payments for access of services, including access of information or other services.

FIG. 1 is a block diagram of an example arrangement that includes a constrained device 102 that has a transmitter 104 to transmit a beacon 106. Although just one constrained device 102 is shown in FIG. 1, it is noted that in other examples, multiple constrained devices 102 can be present, where the constrained devices can be provided at different locations.

Although reference is made to a constrained device, it is noted that techniques or mechanisms according to the present disclosure can also be applied to other types of electronic devices that can transmit information.

The beacon 106 can be transmitted by the transmitter 104 of the constrained device 102 using any of various transmission technologies, including for wireless constrained devices, any or some combination of the following: Bluetooth, BLE, radio-frequency identification (RFID), cellular, 802.15.4, 802.11 Wi-Fi, Near-Field Communication (NFC), Lora, Sigfox, and so forth. Note that in examples where wired constrained devices are used, beacons can be transmitted over wired links.

The beacon 106 includes advertised information that can be received by nearby devices, including the client device 108. "Nearby" devices can include devices within range (e.g., wireless range) of the constrained device 102, devices that are part of a logical or physical group, devices within an organization, devices on a network (such as a mesh network in which a beacon can be repeated by intermediary devices to reach more distant client devices), and so forth.

The client device 108 can include any type of computing device that is able to wirelessly receive information from the constrained device 102, or to receive information over a wired link from a wired electronic device, and that is able to communicate over a network 110. Examples of the client device 108 can include any or some combination of the following: a smartphone, a tablet computer, a notebook computer, a desktop computer, a wearable device (e.g., smart eyeglasses, a head-mounted electronic device, a smart watch, etc.), a game appliance, a home appliance, a vehicle, or any other type of electronic device.

Although just one client device 108 is shown in FIG. 1, it is noted that in other examples, multiple client devices 108 can be present. The multiple client devices 108 can receive the beacon 106 from the constrained device 102. For example, different client devices can be associated with different users. Alternatively, the client device 108 or multiple client devices 108 can receive beacons from multiple constrained devices 102.

In some examples, the network 110 can include a wireless network that allows for the client device 108 to wirelessly communicate with other devices. In alternative examples, the network 110 can include a wired network to which the client device 108 has a wired connection. In further examples, the network 110 can include both a wireless network and a wired network.

In accordance with some implementations of the present disclosure, the beacon 106 contains blockchain information, including a blockchain address 103 of an entity associated with the constrained device 102.

A blockchain address refers to an identifier. In some examples, a blockchain address is analogous to an account number. An entity (such as a user or a device) can include one blockchain address, or can have multiple blockchain addresses. In some examples, a blockchain address can be generated based on use of a pair of a public key and a private key associated with an entity.

As used here, the blockchain address of an entity associated with the constrained device can refer to the constrained device's blockchain address, or can refer to the blockchain address of a product, a machine, a program, a human user, or another entity related to the constrained device. More generally, a blockchain address of an entity associated with a device can refer to information that is used to identify the entity associated with a device.

More generally, a blockchain information can refer to any information that can be used in a blockchain process. A blockchain process can refer to a process that uses a blockchain to store transactions in blocks of the blockchain. A transaction can refer to any event (e.g., an activity, data storage, program execution, etc.).

The blockchain address 103 can be pre-configured in the constrained device 102, such as when the constrained device 102 is initially set up with firmware and/or software (more generally, machine-readable instructions), and/or when the constrained device 102 is being initialized or provisioned. Alternately, the blockchain address 103 can be obtained by the constrained device 102 over a secure connection from an external local or remote source.

The blockchain address 103 can be stored in a storage medium of the constrained device 102 in a secure manner. For example, the blockchain address 103 can be stored in encrypted form in the constrained device 102.

If a blockchain address (or other blockchain information) were included in the beacon 106 in the clear (e.g., no encryption or other obfuscation technique is applied to the blockchain information), then a hacker might obtain the blockchain information for unauthorized reuse of the blockchain address for malicious purposes.

In accordance with some implementations of the present disclosure, instead of sending the blockchain address of an entity associated with the constrained device 102 in the clear, the blockchain address can be secured by applying a cryptographic function on the blockchain address. Applying the cryptographic function on the blockchain address results in computation of a secret value that is included in the beacon 106. More generally, the beacon 106 includes a secure representation of the blockchain address.

Although reference is made to a secure representation of a blockchain address, it is noted that techniques or mechanisms according to some implementations of the present disclosure can be applied to other blockchain information.

In some examples, the constrained device 102 includes a time-based cryptographic logic 105 (which can be implemented with a hardware processing circuit or machine-readable instructions) to apply a time-based cryptographic function on the blockchain address 103. The inputs to the time-based cryptographic function includes a timestamp (indicating the time at which the cryptographic function is being applied) and the blockchain address 103.

In operation, the time-based cryptographic logic 105 can retrieve an encrypted version of the blockchain information 103 from a storage medium of the constrained device 102, decrypt the encrypted version of the blockchain information to obtain decrypted blockchain information, and apply the time-based cryptographic function to the decrypted blockchain information to produce the secure representation of the blockchain information.

The time-based cryptographic function can include a time-based one-time password (TOTP) technique in some examples, which computes a secret value (referred to as a one-time password) using the timestamp and an encryption key. TOTP is an example of a hash-based message authentication code (HMAC) technique.

In other examples, other types of cryptographic functions can be used.

In addition to the secure representation of the blockchain address of an entity associated with the constrained device 102, the beacon 106 can further include other information, such as a description of the constrained device 102 or a description of an entity associated with the constrained device 102, and so forth.

The client device 108 includes a blockchain query application 109 that can generate a query 112 based on the information in the beacon 106. A "query" can refer to a message (or collection of messages), an information element (or collection of information elements), or any other type of information that is submitted to trigger a response from another device.

The query 112 seeks information about a physical item. Examples of physical items include products, inventory, healthcare services, vehicles, humans, insurance policies, and so forth.

In some examples, the client device 108 can include a data presenter 111, such as a display or an audio output device. The data presenter 111 can present data for consumption by a user of the client device 108.

Additionally, in some examples, the client device 108 can include a cryptographic currency wallet application 113, which can be used to make payment for a transaction or to make payment for accessing data (such as by submitting the query 112) or to make payment for any other purpose.

The query 112 can be submitted by the client device 108 to the network 110. In some examples, the network 110 can include an access point (AP) 114, or multiple APs. An AP can refer to an access network node that can be used by an electronic device to gain access to a network. In some examples, the AP 114 can be part of a wireless network (e.g., a Wi-Fi network). In other examples, the AP 114 can refer to a Wide Area Network) WAN or Low Power Wide Area Network (LPWAN) base station or transmission system base station, another low power long range access network (e.g., LoRa and Sigfox) node, or an access node of a cellular network.

In examples where the network 110 is a wired network, the AP 114 can include a bridge, switch or router (or multiple switches/routers) to allow for communication of data with other nodes.

In some examples according to the present disclosure, the query 112 can be sent through the network 110 to a data governance system 115, which can be implemented as a computing node or a distributed arrangement of computing nodes. Multiple data governance systems 115 are shown in FIG. 1. In some examples, a data governance system 115 can be part of a smart contract manager 116, while in other examples a data governance system 115 can be external of the smart contract manager 116. In the ensuing discussion, reference to "the governance system 115" can be to either the governance system in the smart contract manager 116, or outside the smart contract manager 116.

The smart contract manager 116, which can be implemented using a computing node (or a distributed arrangement of computing nodes). The smart contract manager 116 implements enforcement of smart contracts. Although just one smart contract manager 116 is shown in FIG. 1, it is noted that in other examples, there can be multiple smart contract managers.

The smart contract manager 116 can also include blockchain nodes 130 (also referred to as full nodes) that are part of a blockchain network 128.

In some examples, a smart contract can be established among the multiple entities, such as a client entity associated with the client device 108 and an entity associated with stored information that the client device 108 is seeking to access.

In an example, the client device 108 can include a computer in a police vehicle or a police department, the client entity can be a police officer or a dispatcher, and the information sought is the information that is maintained by the Department of Motor Vehicles (DMV) of a particular jurisdiction. The smart contract in this example would be between the police department and the DMV. The smart contract can govern whether or not users of the police department (including police officers, dispatchers, etc.) are allowed to access DMV information, and if so, what types of information are allowed to be accessed given a privilege level corresponding to a role of the client entity. The smart contract can also specify other terms and rules pertaining to access of the DMV information by users of the police department.

In other examples, a smart contract can be established between other types of entities, and can include terms governing access of other types of information.

In some examples, the information that is being sought by the client entity can include information stored in a blockchain (e.g., in blocks of the blockchain). For example, in the context of a DMV, the information stored in the blocks of a blockchain can include historical information about a driver, including traffic violation tickets, arrest warrants, information pertaining to whether payment has been made of the traffic violation tickets, and so forth. The issuance of a traffic violation ticket, the issuance of an arrest warrant, the payment of a traffic violation ticket, and so forth, each constitutes a distinct transaction that can be represented by a respective block of the blockchain.

In other examples where the client entity is a shopper at a retail store, and the information that is sought by the client entity is information that is maintained by a product manufacturer or by the retail store, the smart contract can be between the shopper and the retail store/product manufacturer. In such examples, information pertaining to different products can be maintained by the retail store/product manufacturer in the blocks of a blockchain.

The smart contract manager 116 is a central entity that provides centralized management for purposes of enforcing terms of a smart contract. Note that the smart contract manager 116 is a centralized entity that is used in the context of a distributed storage of information in the blocks of a blockchain.

The query 112 includes the secure representation of the blockchain address of an entity associated with the constrained device 102. The query 112 further specifies an identifier of an entity associated with the client device 108. As used here, an identifier of an entity associated with a client device can refer to an identifier that identifies the client device, or an identifier that identifies an entity associated with the client device, such as a program executing in the client device, the user of the client device, or any other entity that is related to the client device.

Since the query 112 includes a secure representation of the blockchain address of an entity associated with the constrained device 102, the smart contract manager 116 interacts with a blockchain address mapping system 118 to obtain the clear version of the blockchain address. The blockchain address mapping system 118 includes a blockchain address database 117 of registered blockchain addresses, and a time-based cryptographic logic 119 that generates a representation of a blockchain address in the same manner as the time-based cryptographic logic 105 of the constrained device 102.

The blockchain address database 117 stores clear versions of blockchain addresses that have been provisioned at respective constrained devices.

The constrained device 102 is provisioned with a blockchain address (103) and the time-based cryptographic logic (105) from the blockchain address mapping system 118. Once provisioned and synchronized, respective dynamic addresses (computed respectively by the time-based cryptographic logic 105 in the constrained device 102 and by the time-based cryptographic logic 119 in the blockchain address mapping system 118) are the same in both the constrained device 102 and the blockchain address mapping system 118. A "dynamic address" refers to a secure representation of a blockchain address as computed by the time-based cryptographic logic (105 or 119).

Due to the constrained device 102 and the blockchain address mapping system 118 not being exactly time synchronized, there may be a difference in time synchronization between the dynamic addresses in the constrained device 102 and the blockchain address mapping system 118. For example, at time x, the constrained device 102 produces dynamic address 54367, while the blockchain address mapping system 118 produces dynamic address 54367. At time x+5, the constrained device 102 produces dynamic address 54367, while the blockchain address mapping system 118 produces dynamic address 54368. However, at time x+6, the constrained device produces dynamic address 54368, while the blockchain address mapping system 118 produces dynamic address 54368. Thus, in the foregoing example, at time x+5, the dynamic addresses at the constrained device 102 and the blockchain address mapping system 118 are not same due to time synchronization. To address this issue, the blockchain address mapping system 118 can configure a time offset period that represents the difference in time synchronization between the constrained device and the blockchain address mapping system 118.

The blockchain address database 117 can include a lookup function that can map different secure representations of blockchain addresses to respective clear versions of the blockchain addresses. For example, the lookup function can be in the form of a lookup table (or other lookup data structure) having entries, each entry mapping between a corresponding secure representation of a blockchain address and a respective clear version of the blockchain address. The lookup function takes the secure representation of the blockchain address of the query 112 and retrieves the corresponding clear version of the blockchain address, which is returned to the smart contract manager 116. By checking with the blockchain address mapping system, the smart contract manager 116 is able to determine the identity (in the form of a clear version of the blockchain address) of the constrained device 102 about which information is requested.

In some examples, the smart contract manager 116 can interact with a network-based identity server 120, which can be implemented as a computing node or a distributed arrangement of computing nodes. In some examples, the network-based identity server 120 can include an authentication, authorization, and accounting (AAA) server. In other examples, the network-based identity server 120 can be any type of server that can perform authentication and authorization tasks, as well as possibly accounting tasks.

The smart contract manager 116 can provide the following information obtained based on the query 112 to the network-based identity server 120: the identifier of the client entity associated with the client device 108, and the blockchain address (the clear version) of an entity associated with the constrained device 102. The network-based identity server 120, can identify a role of the entity associated with the client device 108. Based on the identified role and the blockchain address, the network-based identity server 120 is able to identify a corresponding smart contract. A "role" of an entity can refer to information indicating a responsibility of or task(s) to be performed by the entity. For example, a human user can have a role of a police officer, a dispatcher, a shopper, a patient, a healthcare provider, etc. As another example, a machine or program can have a role of tracking inventory, managing an information technology infrastructure, and so forth.

Note that the smart contract manager 116 can interact with the blockchain address mapping system 118 and the network-based identity server 120 in parallel, since the two processes are independent of one another.

In some examples, the smart contract manager 116 can maintain a data repository 122 (stored in a storage device or a distributed arrangement of storage devices) that includes mapping information to map various client entity roles and blockchain addresses to corresponding smart contracts 124 that can be stored in the data repository 122 or a different data repository. Using the blockchain address and the identifier of an entity associated with the client device 108 obtained from the query 112 by the smart contract manager 116, the network-based identity server 120 is able to identify the corresponding smart contract 124 from the data repository 122 and provide the smart contract 124 to the smart contract manager 116.

In other examples, instead of interacting with the network-based identity server 120 to identify a role of the entity associated with the client device 108 and a smart contract corresponding to the identified role and the blockchain address, the smart contract manager 116 can perform the foregoing tasks itself, and can access the data repository 122.

The smart contract manager 116 can check the rules of the smart contract to determine a privilege level of the client entity based on the determined role. For example, the smart contract can map different client entity roles to different privilege levels. Based on the determined privilege level, the smart contract manager 116 can determine whether information sought by the query 112 can be shared with the client device 108 (e.g., whether the client device 108 has authorization to receive the information sought by the query 112). For example, the smart contract can specify that information associated with a specific blockchain address can only be shared with certain users or client devices or other entities. Also, the smart contract can specify what information is to be shared.

If the smart contract manager 116 determines that the requested information sought by the query 112 can be shared with the client device 108, the smart contract manager 116 sends the clear version of the blockchain address (126) to a blockchain network 128. The blockchain address 126 can be used to retrieve relevant records from a blockchain.

The blockchain network 128 can include the blockchain nodes 130 (also referred to as "full nodes"), which are distributed nodes that store respective blocks of the blockchain and perform processing relating to the blockchain. The blockchain nodes 130 can also be considered to be part of the smart contract manager 116.

A smart contract can also specify payment information for access to a service such as information sought by the client device 102. Using the corresponding smart contract, the smart contract manager 116 can cause collection of payment according to the smart contract for access of information by the client device 102.

In some examples, rather than store actual data, a block of a blockchain may include a pointer to a storage location in a distributed storage system 132 (including a distributed arrangement of storage nodes, which can be referred to as a swarm in some examples) that stores the actual data corresponding to the block.

Blocks in the blockchain have some amount of information about each transaction, such as which accounts are involved, how much currency was transferred, some detail about the transaction, a timestamp representing a time of the transaction, some data and a reference to the external distributed storage system 132 that contains additional data. A full node 130 can retrieve and share the additional data from the distributed storage system 132. The full node 130 can send a retrieve request to the appropriate distributed storage system (e.g., 132) based on the blockchain address. The retrieve request is validated, and any charges for requesting and obtaining the requested data can be applied. Once validated and any charges collected, the requested data can be returned from the distributed decentralized storage system 132 to the full node 130, which sends the requested data to the smart contract manager 116.

Note that the information obtained from the blockchain network 128 is created or provided by a data owner (or multiple data owners) that is (are) different from the constrained device 102. The constrained device 102 is not able to manipulate the information, which may have been provided at different points in time, and from different data owners. As a result, the client entity associated with the client device 108 can be sure that the returned information is trustworthy and secure.

The requested data relating to the blockchain address 126 is returned back to the smart contract manager 116 by the blockchain network 128. The smart contract manager 116 can then decide, based on the smart contract, which selected information (which can include all of the relevant data or just a subset of the relevant data) is to be sent back to the client device 108 in response to the query 112.

The selecting of the information to send back to the client device 108 is part of the filtering that can be applied on the information obtained from the blockchain network 128. The filtering is based on the determined privilege level associated with the client entity, and produces customized information for the client entity in response to the query 112. The filtering produces different filtered response information for different privilege levels, as specified by a smart contract.

The smart contract manager 116 sends a response (134) containing the filtered information back to client device 108.

At the client device 108, the filtered information in the response (134) can be used for the corresponding interaction, such as a user deciding whether or not to purchase a product based on the selected information, a user viewing further information about a product or its attributes, the client device 108 or a different device tracking inventory based on the selected information, a user (e.g., healthcare provider such as a doctor or nurse) providing a healthcare service to a patient based on the selected information, the client device 108 or a different device detecting theft based on the selected information, a law enforcement officer performing a law enforcement activity based on the selected information, a user purchasing an insurance policy or an insurance company setting a rate for an insurance policy based on the selected information, and so forth.

In some examples, the smart contract manager 116 includes an authorization request monitoring system (ARMS) 136 to detect unauthorized use of a secure representation of a blockchain address. The ability to detect unauthorized use of a secure representation of a blockchain address can have applications in law enforcement, security, anti-fraud efforts, and so forth. This ability also aids in securing the integrity of blockchain addresses and the integrity of interactions between entities represented in a blockchain network.

The authorization request monitoring system 136 can be part of the smart contract manager 116, and can include a hardware processing circuit or a combination of machine-readable instructions and the hardware processing circuit of the smart contract manager 116. In other examples, the authorization request monitoring system 136 can be separate from the smart contract manager 116, and can be implemented on a computing node (or multiple computing nodes) separate from the computing node(s) of the smart contract manager 116.

For example, the authorization request monitoring system 136 can check to ensure that a secure representation of a blockchain address that has already been used once (such as in the query 112 sent from the client device 108 to the smart contract manager 116) is not reused again. If the authorization request monitoring system 136 detects that a particular secure representation of a blockchain address has been used more than once, then the authorization request monitoring system 136 can take a security action. The security action can include any or some combination of the following: issuing an alert to a target entity (e.g., a network administrator or other entity), rejecting the query 112 by sending an error response back to the client device 108, quarantining the client device 108, backlisting the client device 108, or another security action.

Additionally, in some examples, a particular secure representation of a blockchain address can be associated with a specific time range and/or a specific location. If the authorization request monitoring system 136 detects that the particular secure representation of a blockchain address is used outside the specific time range and/or away from the specific location (e.g., a specific geographic region, a specific location in a network, etc.), then the authorization request monitoring system 136 can issue an alert to a target entity and/or can reject the query 112 by sending an error response back to the client device 108.

The alert that is issued to a target entity regarding an unauthorized use of a secure representation of a blockchain address can allow for identification of a security breach in a system (e.g., a security breach caused by a masquerading attack or other type of attack).

In addition to the foregoing tasks, the authorization request monitoring system 136 can track and log all requests, irrespective of success or failure of the requests. For example, the authorization request monitoring system 136 can log approval of access of the response information by a client entity, and log a respective privilege level of the response information. In addition, the authorization request monitoring system 136 can update a block of a blockchain for a transaction that includes the approval of access to the response information.

Figure 2:
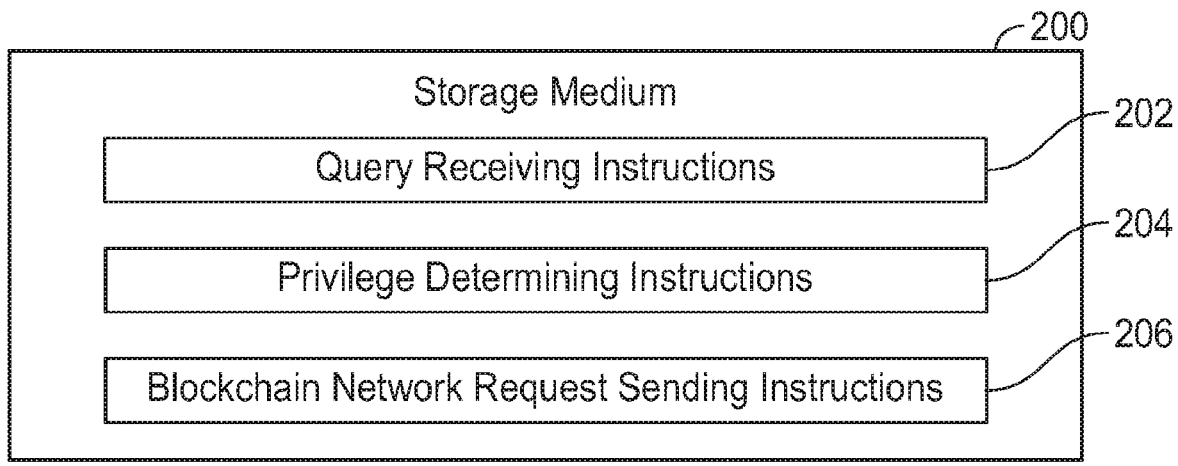
FIG. 2 is a block diagram of a storage medium storing machine-readable instructions according to some examples.

FIG. 2 is a block diagram of a non-transitory machine-readable or computer-readable storage medium 200 storing machine-readable instructions that upon execution cause a system to perform various tasks. The machine-readable instructions include query receiving instructions 202 to receive, from a client device, a query comprising a representation of blockchain information of an entity associated with an electronic device that advertised the representation.

The machine-readable instructions further include privilege determining instructions 204 to determine whether a client entity associated with the client device has a privilege to access response information that is responsive to the query. The machine-readable instructions additionally include blockchain network request sending instructions 206 to, in response to determining that the client entity has the privilege to access the response information, send, to a blockchain network, a request containing the blockchain information to obtain the response information.

Figure 3:
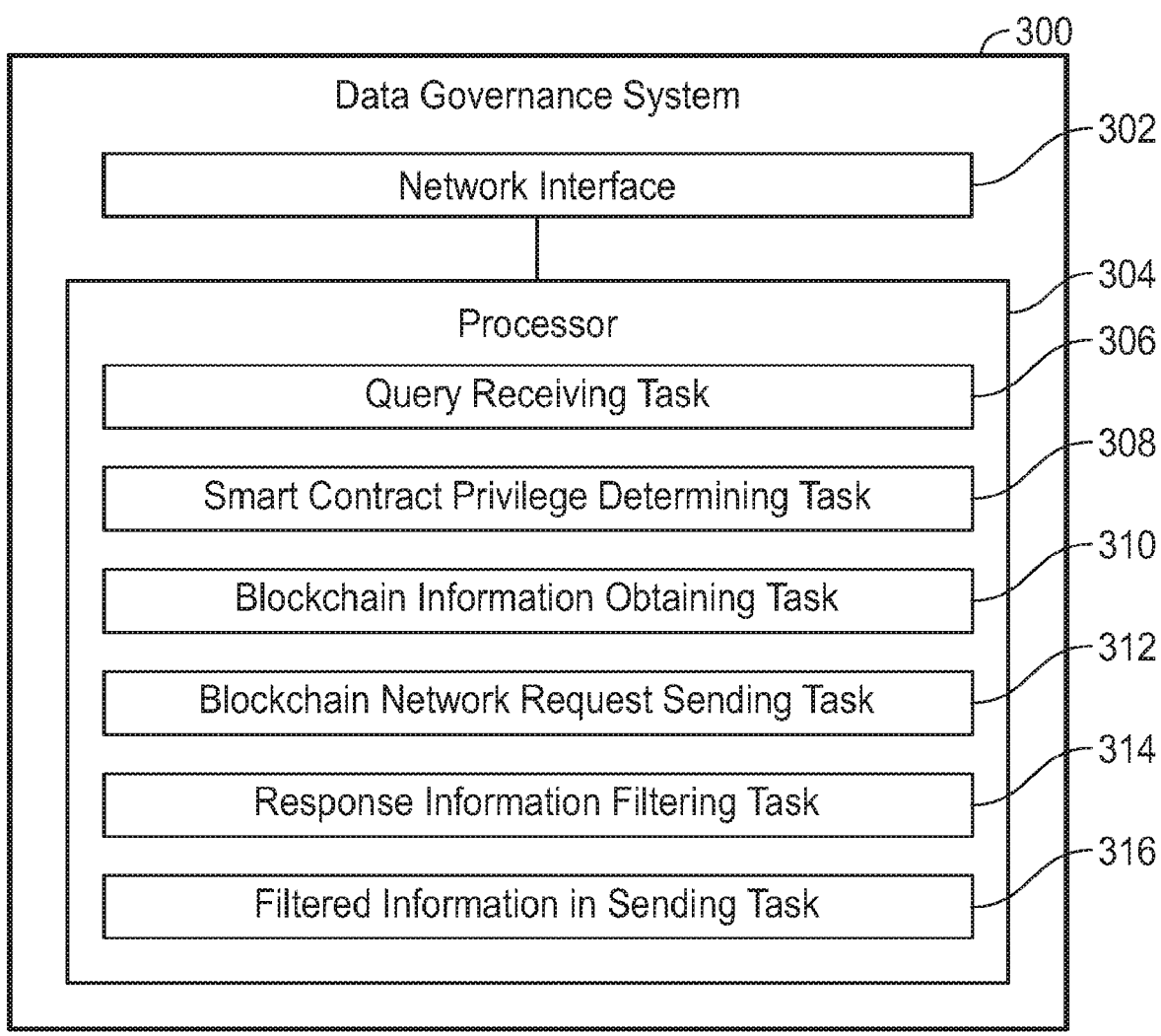
FIG. 3 is a block diagram of a data governance system according to further examples.

FIG. 3 is a block diagram of a data governance system 300 that includes a network interface 302 to communicate with a client device, and a processor 304 to perform various tasks. A processor can include a microprocessor, a core of a multi-core microprocessor, a microcontroller, a programmable integrated circuit, a programmable gate array, or another hardware processing circuit. A processor performing a task can refer to one processor performing the task, or multiple processors performing the task.

The tasks include a query receiving task 306 to receive, from the client device, a query comprising a representation of blockchain information of an entity associated with a constrained device that transmitted the representation. The tasks further include a smart contract privilege determining task 308 to determine, based on a smart contract, a privilege level of a client entity associated with the client device. The tasks also include a blockchain information obtaining task 310 to obtain the blockchain information based on the representation of the blockchain information.

In addition, the tasks include a blockchain network request sending task 312 to send, to a blockchain network, a request containing the blockchain information to obtain response information. The tasks further include a response information filtering task 314 to filter the response information based on the privilege level of the client entity, and a filtered information sending task 316 to send, to the client device, the filtered information in response to the query.

Figure 4:
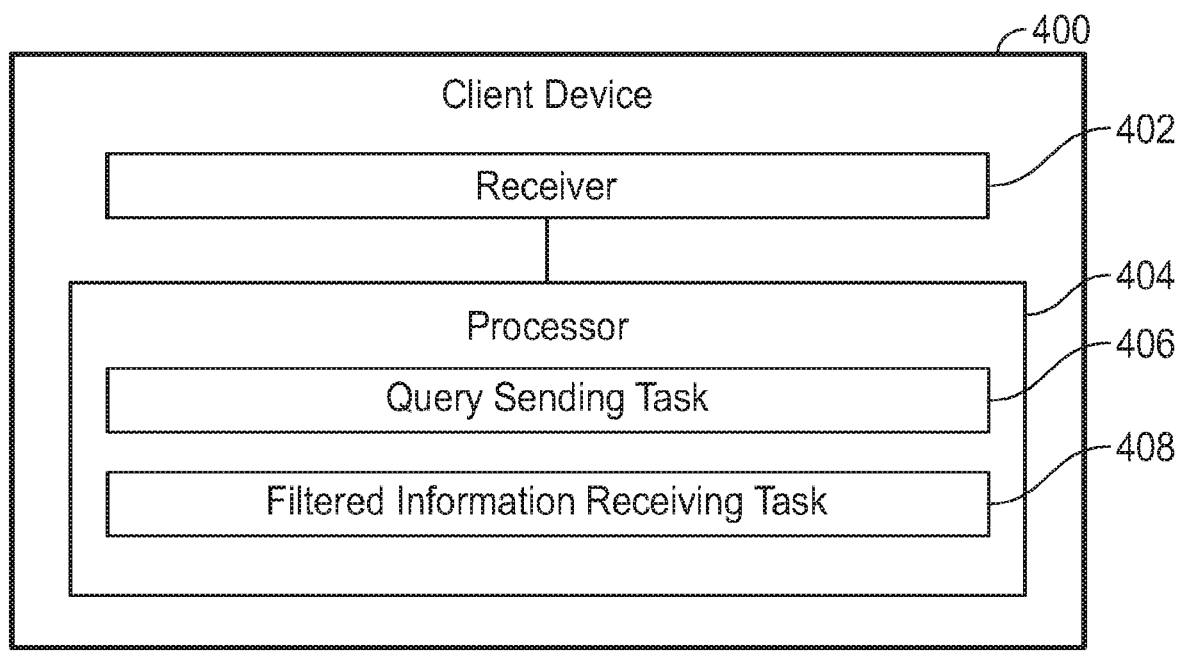
FIG. 4 is a block diagram of a client device according to other examples.

FIG. 4 is a block diagram of a client device 400 that includes a receiver 402 to receive, from a constrained device, a representation of blockchain information of an entity associated with the constrained device. In addition, the client device 400 includes a processor 404 to perform various tasks. The tasks include a query sending task 406 to send, to a server (e.g., the data governance system 115 of FIG. 1), a query containing the representation. The tasks further include a filtered information receiving task 408 to receive, from the server, filtered information responsive to the query, the filtered information derived by the server based on a privilege level of the client device, a smart contract, and the blockchain information.

The storage medium 200 of FIG. 2 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Storage can be located on premise, off premise, at a managed service provider, in a private or public cloud, or any combination thereof.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions that upon execution cause a smart contract manager to:
   receive, at the system from a client device, a query comprising a time-based secure representation of a blockchain address of an entity associated with an electronic device that advertised information comprising the time-based secure representation of the blockchain address;
   determine whether a client entity associated with the client device has a privilege to access response information that is responsive to the query;
   in response to determining that the client entity has the privilege to access the response information, send, from the system to a blockchain network, a request containing the blockchain address to obtain the response information;
   receive, at the system from the blockchain network, the response information comprising a record relating to the blockchain address; and
   in response to the query, access a blockchain address mapping system using the time-based secure representation of the blockchain address to obtain a clear version of the blockchain address.

2. The non-transitory machine-readable storage medium of claim 1, wherein the instructions upon execution cause the smart contract manager to:
   interact with a network-based identity server to obtain information about the client entity.

3. The non-transitory machine-readable storage medium of claim 1, wherein the blockchain address mapping system comprises mapping information to map different time-based secure representations of blockchain addresses to corresponding clear versions of the blockchain addresses.

4. The non-transitory machine-readable storage medium of claim 3, wherein the mapping information comprises a lookup table.

5. The non-transitory machine-readable storage medium of claim 3, wherein the blockchain address is provisioned at the electronic device by the blockchain address mapping system.

6. The non-transitory machine-readable storage medium of claim 5, wherein the time-based secure representation of the blockchain address was generated at the electronic device based on a time-based cryptographic function provisioned at the electronic device by the blockchain address mapping system.

7. The non-transitory machine-readable storage medium of claim 5, wherein the time-based secure representation of the blockchain address was generated at the electronic device using a time offset provided by the blockchain address mapping system to maintain time synchronization between the blockchain address mapping system and the electronic device.

8. The non-transitory machine-readable storage medium of claim 1, wherein the instructions upon execution cause the smart contract manager to:
   filter the response information based on a privilege level of the client device to produce filtered response information, wherein the filtering is to produce different filtered response information for different privilege levels according to a smart contract; and
   send, to the client device, the filtered response information in response to the query.

9. The non-transitory machine-readable storage medium of claim 2, wherein the blockchain address contained in the request from the smart contract manager to the blockchain network is the clear version of the blockchain address.

10. The non-transitory machine-readable storage medium of claim 1, wherein the time-based secure representation of the blockchain address is produced based on applying a time-based cryptographic function to the blockchain address at the electronic device.

11. The non-transitory machine-readable storage medium of claim 1, wherein the advertised information was transmitted by the electronic device in a beacon.

12. The non-transitory machine-readable storage medium of claim 8, wherein the instructions upon execution cause the smart contract manager to:
   determine a role of the client entity; and
   identify the smart contract based on the role by accessing mapping information that maps different client entity roles to different smart contracts.

13. The non-transitory machine-readable storage medium of claim 1, wherein the instructions upon execution cause the smart contract manager to:
   in response to determining that the client entity does not have the privilege to access the response information, reject the query.

14. A data governance system comprising:
   a network interface to communicate with a client device;
   a processor; and
   a non-transitory storage medium storing instructions executable on the processor to:
      receive, at the data governance system from the client device, a query comprising a time-based secure representation of a blockchain address of an entity associated with a constrained device that transmitted information comprising the time-based secure representation of the blockchain address;
      determine, based on a smart contract, a privilege level of a client entity associated with the client device;
      obtain a clear version of the blockchain address based on the time-based secure representation of the blockchain address;
      send, to a blockchain network, a request containing the clear version of the blockchain address to obtain response information comprising a record relating to the blockchain address; and
      filter the response information based on the privilege level of the client entity; and
   send, to the client device, the filtered response information in response to the query, wherein the clear version of the blockchain address is obtained from a blockchain address mapping system using the time-based secure representation of the blockchain address and based on mapping information that maps different time-based secure representations of blockchain addresses to corresponding clear versions of the blockchain addresses.

15. The data governance system of claim 14, wherein the blockchain address is provisioned at the constrained device by the blockchain address mapping system.

16. The data governance system of claim 15, wherein the time-based secure representation of the blockchain address was generated at the constrained device based on a time-based cryptographic function provisioned at the constrained device by the blockchain address mapping system.

17. A method comprising:
- receiving, at a data governance system comprising a hardware processor from a client device, a query comprising a time-based secure representation of a blockchain address of an entity associated with an electronic device that advertised information comprising the time-based secure representation of the blockchain address;
- determining, by the data governance system, whether a client entity associated with the client device has a privilege to access response information that is responsive to the query;
- in response to determining that the client entity has the privilege to access the response information, sending, by the data governance system to a blockchain network, a request containing a clear version of the blockchain address to obtain the response information;
- receiving, at the data governance system from the blockchain network, the response information comprising a record relating to the blockchain address; and
- interacting with a network-based identity server to obtain information about the client entity; and
- accessing, by the data governance system, a blockchain address mapping system using the time-based secure representation of the blockchain address to obtain the clear version of the blockchain address, wherein the time-based secure representation of a blockchain address was generated at the electronic device using a time-based cryptographic function provisioned to the electronic device by the blockchain address mapping system.

* * * * *